(12) United States Patent
Ishii

(10) Patent No.: US 9,412,151 B2
(45) Date of Patent: Aug. 9, 2016

(54) IMAGE PROCESSING APPARATUS AND IMAGE PROCESSING METHOD

(75) Inventor: Masatoshi Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 546 days.

(21) Appl. No.: 13/603,952

(22) Filed: Sep. 5, 2012

(65) Prior Publication Data

US 2013/0063571 A1    Mar. 14, 2013

(30) Foreign Application Priority Data

Sep. 12, 2011    (JP) ................. 2011-198878

(51) Int. Cl.
| | |
|---|---|
| *G03B 35/00* | (2006.01) |
| *G06T 5/00* | (2006.01) |
| *G06T 15/20* | (2011.01) |
| *G06T 5/50* | (2006.01) |
| *G06T 7/00* | (2006.01) |

(52) U.S. Cl.
CPC . *G06T 5/003* (2013.01); *G06T 5/50* (2013.01); *G06T 7/0075* (2013.01); *G06T 15/205* (2013.01); *G06T 2200/21* (2013.01); *G06T 2207/10012* (2013.01)

(58) Field of Classification Search
USPC .......................................................... 396/326
See application file for complete search history.

(56) References Cited

U.S. PATENT DOCUMENTS

| | | | |
|---|---|---|---|
| 7,454,134 B2 | 11/2008 | Sato | |
| 8,290,358 B1 * | 10/2012 | Georgiev | G03B 35/10 |
| | | | 396/326 |
| 8,325,241 B2 | 12/2012 | Yoshioka | |
| 2011/0085741 A1 | 4/2011 | Zhang et al. | |

FOREIGN PATENT DOCUMENTS

| | | |
|---|---|---|
| CN | 101800854 A | 8/2010 |
| JP | 2006-140594 A | 6/2006 |
| JP | 2008-294785 A | 12/2008 |
| JP | 2009-009404 A | 1/2009 |
| JP | 2011-022796 A | 2/2011 |

OTHER PUBLICATIONS

N. Kusumoto et al., "Uncalibrated Synthetic Aperture for Defocus Control", CVPR, IEEE pp. 2552-2559, (2009).

* cited by examiner

*Primary Examiner* — Jefferey Harold
*Assistant Examiner* — Sihar Karwan
(74) *Attorney, Agent, or Firm* — Fitzpatrick, Cella, Harper & Scinto

(57) ABSTRACT

This invention improves the image quality of areas that the user want sharply focused. Depth values representing positions in a depth direction of scenes including the photographed object are estimated to generate a depth map. The focus map generation unit, based on the virtual focus parameter 305 and the depth map, generates by an area dividing operation a focus map representing an area to be sharply focused (in-focus area) and an area to be blurred (out-of-focus area). The in-focus area image processing unit places greater importance on the in-focus area in the image processing to generate an in-focus area image. The out-of-focus area image processing unit puts greater importance on the out-of-focus area in the image processing to generate an out-of-focus area image. The image blending unit generates a refocused image by blending the in-focus area image and the out-of-focus area image.

3 Claims, 24 Drawing Sheets

○ PHOTOGRAPHING POSITIONS

◎ VIRTUAL VIEWING POSITIONS FOR WHICH INTERPOLATED IMAGE IS TO BE GENERATED BY S1402

○ PHOTOGRAPHING POSITIONS AND
   VIRTUAL VIEWING POSITIONS ALREADY
   PROCESSED BY S1402

◉ VIRTUAL VIEWING POSITIONS FOR
   WHICH INTERPOLATED IMAGE IS
   TO BE GENERATED BY S1403

| A(0) | A(1) | A(2) | A(3) | A(4) |
|---|---|---|---|---|
| A(5) | A(6) | A(7) | A(8) | A(9) |
| A(10) | A(11) | A(12) | A(13) | A(14) |
| A(15) | A(16) | A(17) | A(18) | A(19) |
| A(20) | A(21) | A(22) | A(23) | A(24) |

=

| 0.024 | 0.035 | 0.039 | 0.035 | 0.024 |
|---|---|---|---|---|
| 0.035 | 0.048 | 0.054 | 0.048 | 0.035 |
| 0.039 | 0.054 | 0.060 | 0.054 | 0.039 |
| 0.035 | 0.048 | 0.054 | 0.048 | 0.035 |
| 0.024 | 0.035 | 0.039 | 0.035 | 0.024 |

WEIGHT COEFFICIENTS USED FOR IMAGE SYNTHESIS

FIG.11

IMAGE PROCESSING APPARATUS AND IMAGE PROCESSING METHOD

BACKGROUND OF THE INVENTION

1. Field of the Invention

The present invention relates to an image processing apparatus and an image processing method and more particularly to an image processing apparatus and an image processing method for synthesizing a plurality of images photographed from multiple viewpoints to produce a refocused image.

2. Description of the Related Art

An image refocusing method has been known which produces, from pictures taken from a plurality of viewpoints, an image that is refocused at a desired virtual focal distance by subjecting them to an image position alignment operation and an image synthesizing operation (see Japanese Patent Laid-Open No. 2011-22796 and "Uncalibrated Synthetic Aperture for Defocus Control," by Natsumi Kusumoto et al., CVPR, page 2552-2559, IEEE, (2009)). According to an invention, which is disclosed in Japanese Patent Laid-Open No. 2011-22796 and also presented in "Uncalibrated Synthetic Aperture for Defocus Control," by Natsumi Kusumoto et al., a refocused image is produced by using a plurality of images shot at different photographing positions, shifting or deforming the individual images according to their photographing positions and a distance to an object one wishes to focus on and then synthesizing them.

The method discussed in "Uncalibrated Synthetic Aperture for Defocus Control," by Natsumi Kusumoto et al., improves the image quality of out-of-focus areas outside the depth of field by generating intermediate viewpoint images between photographed images by estimation. This method, however, has a problem that the generation of intermediate viewpoint images produces an effect of blurring even an area one wishes to focus on. Another problem of this method is that as the resolution of an output image is increased, a large number of intermediate viewpoint images are required for creating a smooth blur gradation, entailing huge calculation costs. It is therefore an object of this invention to improve the quality of an area to be held in focus while reducing the calculation cost for generating the intermediate viewpoint images.

SUMMARY OF THE INVENTION

To solve the problem mentioned above, the image processing apparatus of this invention comprises: a photographed data input means to acquire a plurality of images photographed from at least two different viewing positions; an input means to input a refocus parameter representing a distance from a camera to a virtual focal plane; a distance estimation means to generate a depth map for the acquired images indicating distances between photographed objects corresponding to pixels and a camera; a focus map generation means to generate a focus map indicating an in-focus area to be sharply focused and an out-of-focus area to be blurred, by calculating areas including the in-focus area and the out-of-focus area from the depth map according to the refocus parameters; an in-focus area image processing means to generate a synthesized image by performing a predetermined operation on the in-focus area and synthesizing a group of images including at least the photographed images; an out-of-focus area image processing means to generate a synthesized image by performing an operation, different from the predetermined operation performed by the in-focus area image processing means, on the out-of-focus area and synthesizing a group of images including at least the photographed images; and an image blending means to generate a refocused image by blending the synthesized image of the in-focus area and the synthesized image of the out-of-focus area according to the focus map.

By performing different operations on an area the user wants sharply focused and on an area he or she wants blurred, this invention offers a capability of improving the image quality of the area to be sharply focused while at the same time minimizing calculation cost for generating images that would appear when photographed from virtual, intermediate viewing positions.

Further features of the present invention will become apparent from the following description of exemplary embodiments (with reference to the attached drawings).

BRIEF DESCRIPTION OF THE DRAWINGS

FIG. 11 shows an example of weight coefficients in the embodiment of the invention;

DESCRIPTION OF THE EMBODIMENTS

Embodiment 1

This embodiment relates to a refocusing process that produces, from a plurality of images shot by a multiview photographing device or camera having a plurality of camera units, an image that is focused at a desired virtual focal distance by image processing. That is, the refocusing process of this embodiment involves performing a resolution enhancement operation on an area that the user wants focused and, in an area that the user wants blurred, generating an out-of-focus image with a resolution lower than an output resolution. First, an example system configuration of the image processing apparatus of this embodiment will be described by referring to FIG. 1.

Figure 1:
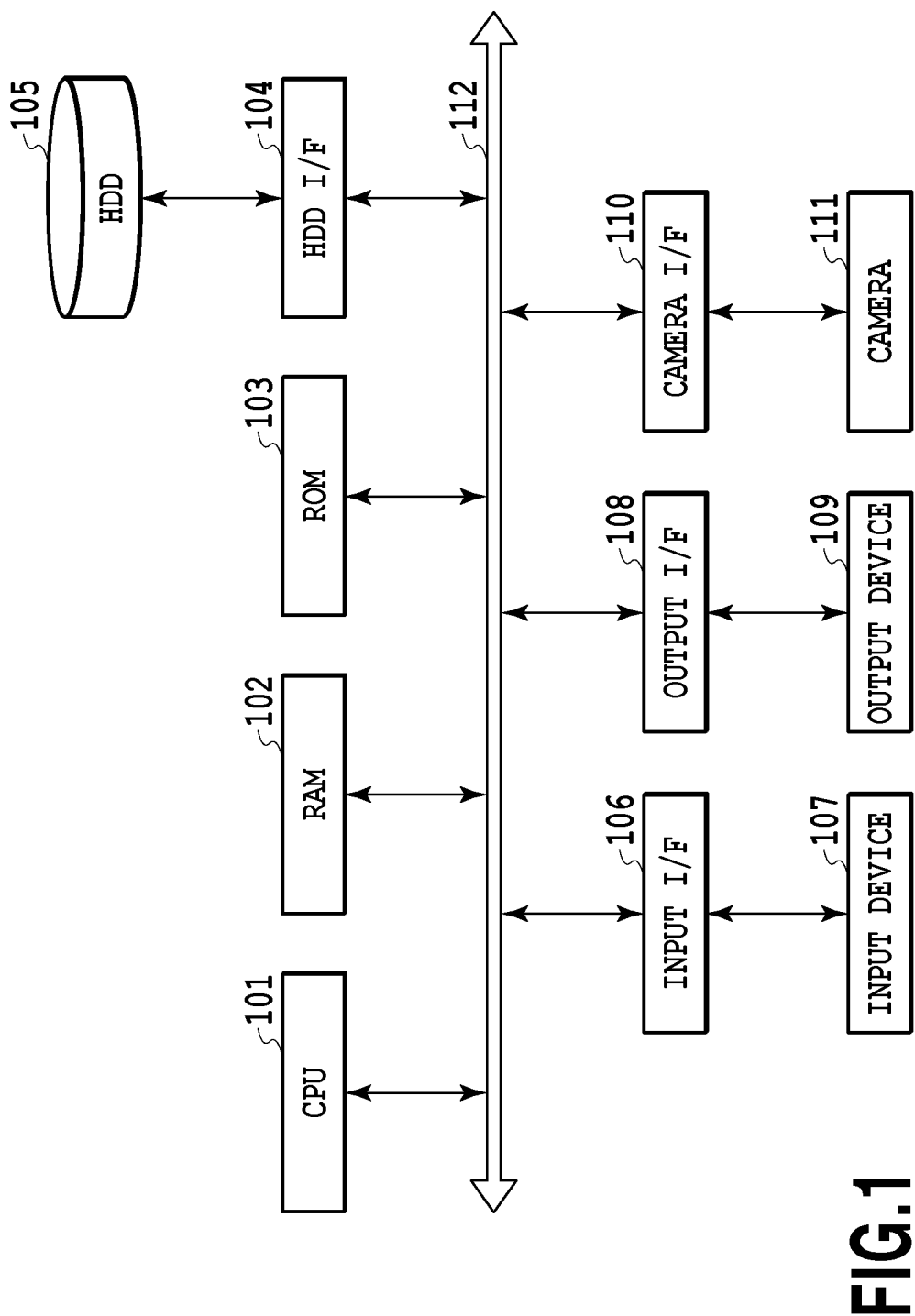
FIG. 1 is a block diagram showing a system configuration of an image processing apparatus in an embodiment of this invention.

In FIG. 1, CPU 101 executes programs stored in a ROM 103 and a hard disk drive (HDD) 105, using a RAM 102 as a work memory, to control a variety of components via a system bus 112. A HDD interface (I/F) 104 is, for example, a serial ATA (SATA) interface for connection with secondary storage devices such as the HDD 105 and optical disc drives. The CPU 101 can read data from the HDD 105 through the HDD I/F 104 and write data into the HDD 105. Further, the CPU 101 can develop the data stored in the HDD 105 onto the RAM 102 and also store the data developed on the RAM 102 into the HDD 105. The CPU 101 then can execute as a program the data developed on the RAM 102. An input interface (I/F) 106 is, for example, a serial bus interface such as USB and IEEE1394 for connection with an input device 107 such as keyboard and mouse. An output interface (I/F) 108 is, for example, DVI and HDMI for connection with an output device 109 such as monitor and projector. The CPU 101 can send data through the output I/F 108 to the output device 109 for display. A camera interface (I/F) 110 is, for example, a serial bus interface such as USB and IEEE1394 for connection with a camera 111 such as digital camera. The CPU 101 can control the camera 111 through the camera I/F 110 to shoot a picture. It also can take in picture data from the camera 111 through the camera I/F 110.

Figure 2:
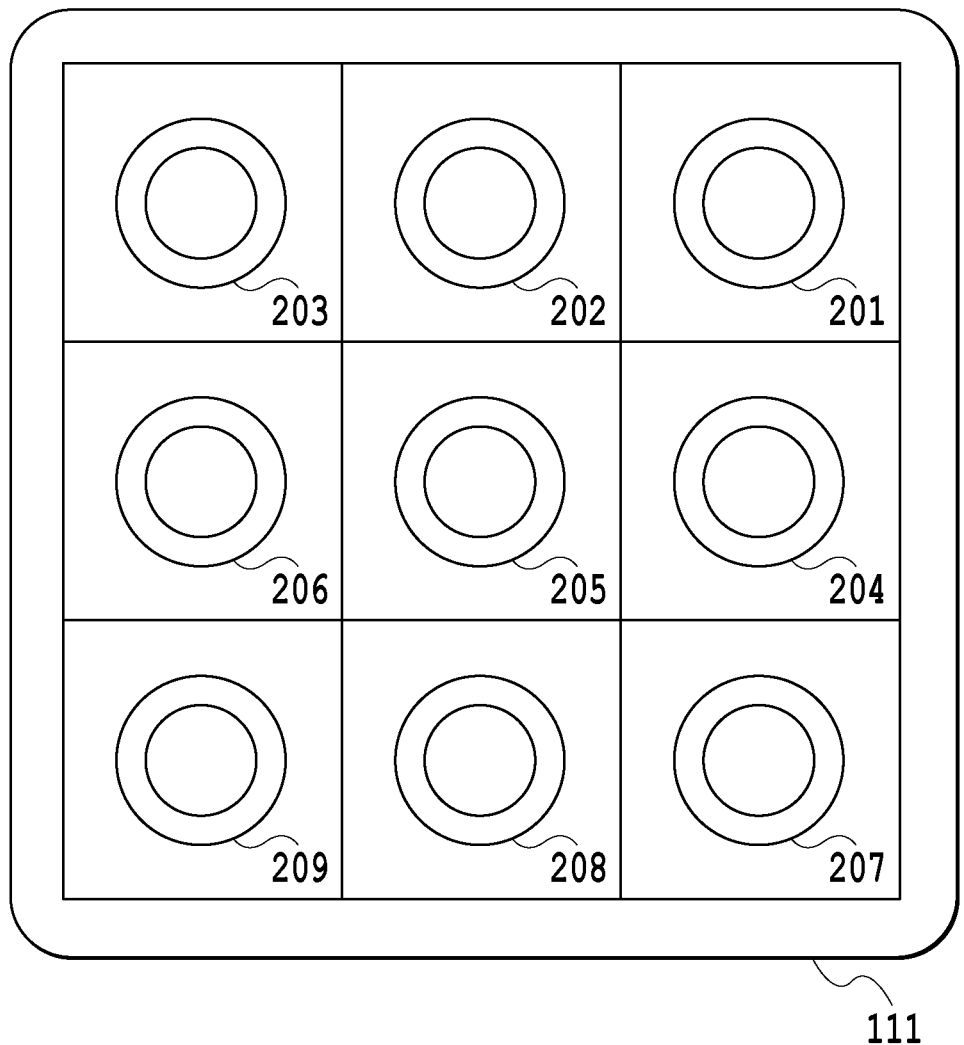
FIG. 2 shows a photographing in the embodiment of the invention.

FIG. 2 shows the camera 111 in this embodiment. This photographing device is a multiview camera with nine camera units 201-209 for shooting pictures. For simple explanation, the nine camera units 201-209 are evenly arranged on square lattice points. It is assumed that these camera units have their vertical and lateral axes and optical axes arranged in the same directions. These camera units 201-209 receive optical information of an object at their sensors (image sensing devices), with the received optical signals A/D-converted to produce a plurality of photographed images (digital data) at one time. With the multiview camera of the above construction, multiple shots of one and the same object taken from a plurality of viewing positions can be obtained. It should be noted here that the number of camera units is not limited to nine, which is adopted in this example case, and that this invention is applicable as long as the photographing device has two or more camera units. It is also noted that while in this example the nine camera units are evenly distributed over the square lattice, any other arrangement may be used according to the system configuration.

Figure 3:
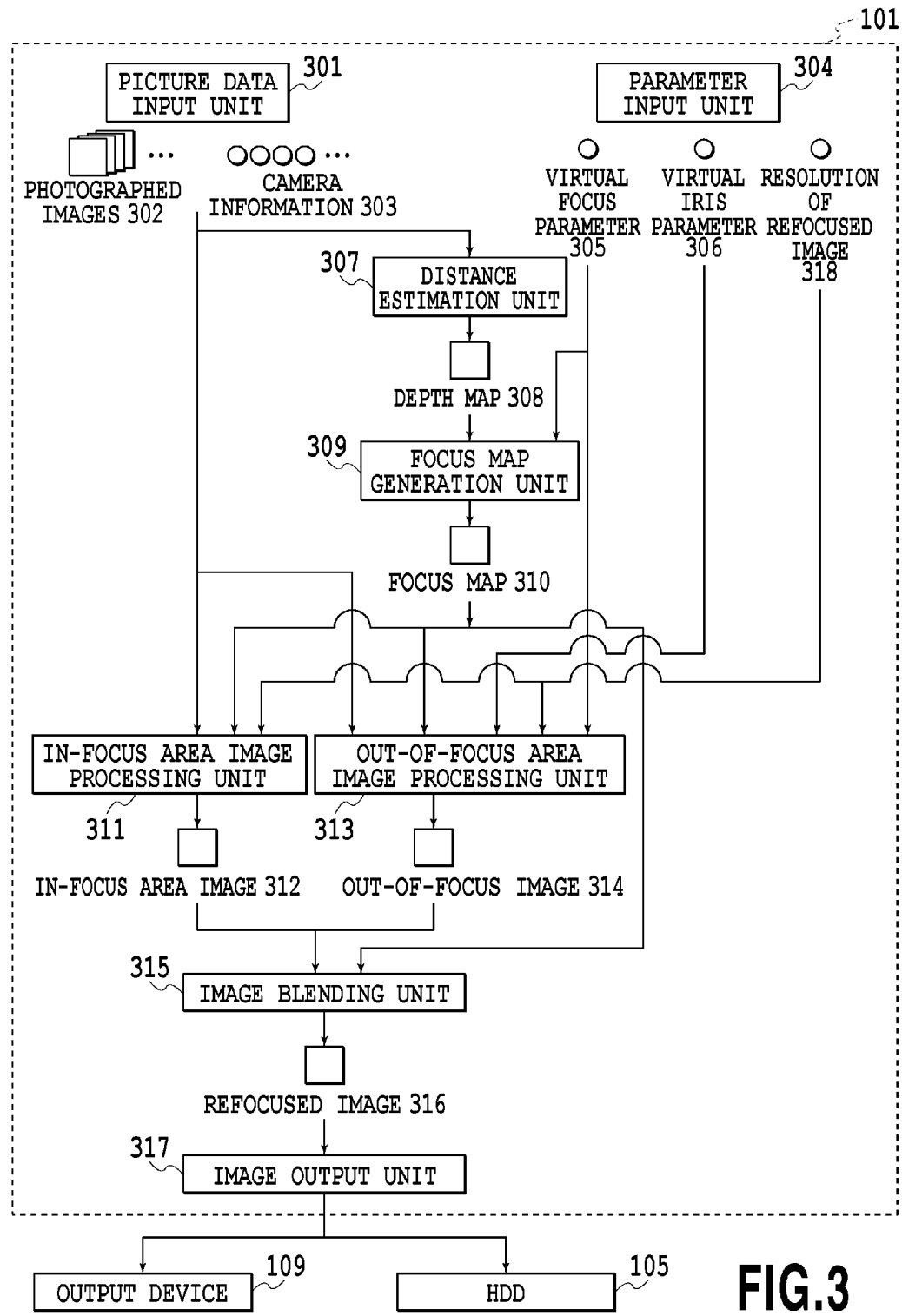
FIG. 3 is a schematic functional configuration in the embodiment of the invention.

Next, an outline configuration of functions that execute a series of processing in this embodiment will be explained by referring to FIG. 3. A picture data input unit 301 as a functional unit of the CPU 101 retrieves from the storage device a plurality of images 302 of an object shot by the camera 111 at different positions and camera information 303 including view angles and positions of the camera 111. The storage device includes, but is not limited to, the camera 111, ROM 103 and HDD 105. A parameter input unit 304 as a functional unit of the CPU 101 retrieves from the input device 107 or the storage device a virtual focus parameter 305 or refocus parameter, including a distance to a virtual focus plane, and a virtual iris parameter 306. It is noted here that the storage device includes, but is not limited to, the ROM 103 and HDD 105. Further, the parameter input unit 304 also retrieves a resolution 318 of the refocused image generated by the refocusing process from the input device 109 or from the storage device such as the ROM 103 and HDD 105.

A distance estimation unit 307 as a functional unit of the CPU 101 estimates a depth value representing a depth position of a scene containing the object of interest by a stereo matching based on the photographed image 302 and the camera information 303 to generate a depth map 308. A focus map generation unit 309 generates a focus map 310 representing an area where the user wants sharp images (in-focus area) and an area where he or she wants blurred images (out-of-focus area) by an area dividing process based on the virtual focus parameter 305 and the depth map 308. The focus map generation unit 309 works as a functional unit of the CPU 101.

An in-focus area image processing unit 311 as a functional unit of the CPU 101 performs image processing with greater emphasis placed on the in-focus area according to the photographed image 302, the camera information and the focus map 310 to generate an in-focus area image 312. An out-of-focus area image processing unit 313 as a functional unit of the CPU 101 performs image processing with greater emphasis placed on the out-of-focus area, using the photographed image 302, the camera information 303, the focus map 310 and the virtual iris parameter 306, to generate an out-of-focus area image 314. An image blending unit 315 as a functional unit of the CPU 101 generates a refocused image 316 by an image blending process, using the in-focus area image, the out-of-focus area image 314 and the focus map 310. An image output unit 317 as a functional unit of the CPU 101 sends the refocused image 316 to the output device 109 and secondary storage device such as HDD 105.

Figure 4:
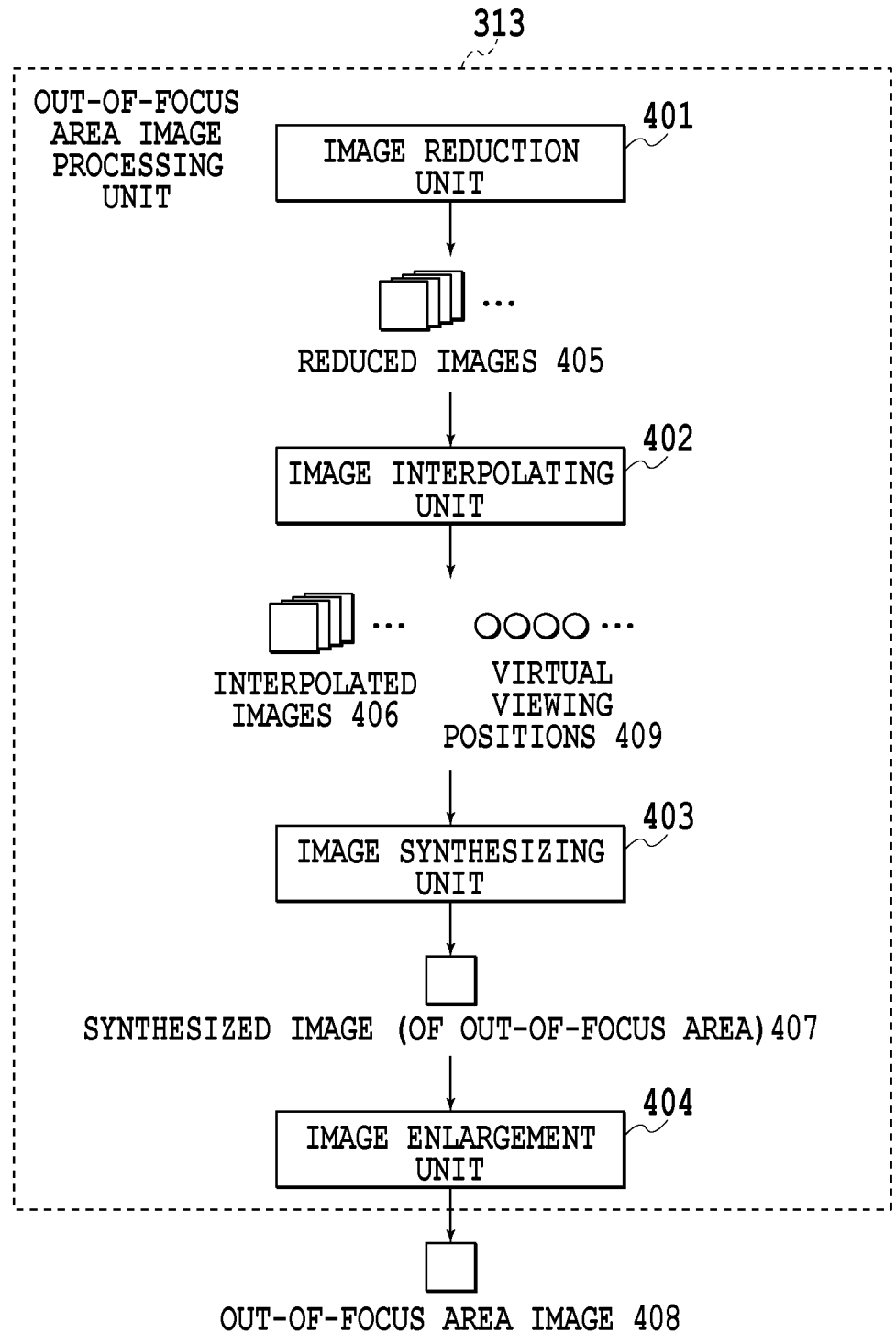
FIG. 4 shows a detail of an out-of-focus area image processing unit in the embodiment of the invention.

FIG. 4 shows an outline configuration of functions in the out-of-focus area image processing unit. An image reduction unit 401 as a functional unit of the CPU 101 reduces the photographed image 302 to generate a reduced image 405. This allows the cost of calculations, performed to generate interpolating images required by the image synthesizing process, to be lowered by synthesizing the reduced images and then enlarging the synthesized image. An image interpolating unit 402 as a functional unit of the CPU 101 sets virtual viewing positions 409 based on the camera information 303 so that they come between the photographing positions of the images 302. Then, interpolated images 406 that would be obtained if shot from the respective virtual viewing positions 409 are generated by interpolating between the reduced images 405.

An image synthesizing unit 403 as a functional unit of the CPU 101 synthesizes the reduced images 405 and the interpolated images 406, using the camera information 303, virtual viewing positions 409, virtual focus parameter 305, virtual iris parameter 306 and focus map 310. The image synthesizing process produces a synthesized image (of the out-of-focus area) 407. An image enlargement unit 404 as a functional unit of the CPU 101 enlarges the synthesized image (of the out-of-focus area) 407 to the resolution 318 of the refocused image to produce an out-of-focus area image 408.

Figure 13:
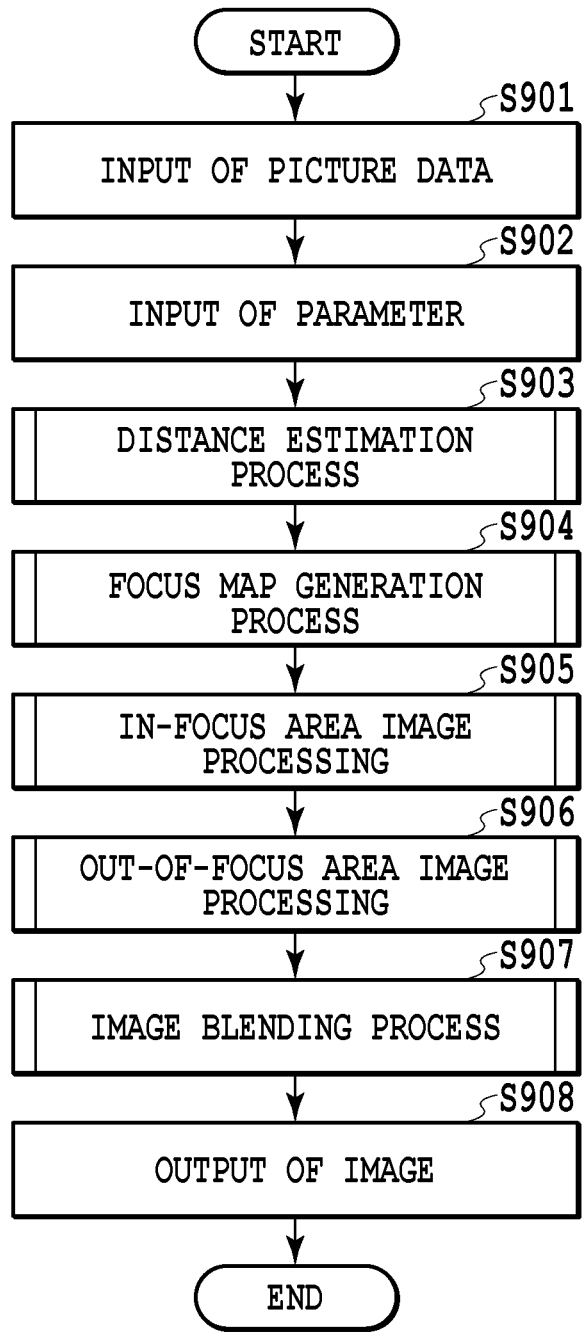
FIG. 13 is a flow chart showing a sequence of steps performed in the embodiment of the invention.

FIG. 13 is a flow chart showing an overall sequence of processes performed by the image processing apparatus of this embodiment. More specifically a computer-executable program describing the procedure shown in the flow chart of FIG. 13 is loaded from the ROM 103 or HDD 105 into the RAM 102 where it is executed by the CPU 101. The flow chart of FIG. 13 shows only an overall flow of processes, so details of each process that are characteristic of this embodiment will be explained by further referring to FIG. 14 to FIG. 20.

At step S901, the picture data input unit 301 takes pictures 302 using the camera 111 and acquires the pictures or photographed images 302 and the camera information 303 including an angle of view and photographing position of each camera unit of the camera 111. Alternatively, the camera information 303, such as the view angles and the photographing positions of the camera units of the camera 111, may be stored in advance in a storage device such as ROM 103 and HDD 105 and retrieved therefrom by the picture data input unit 301.

At step S902, the parameter input unit 304 retrieves from the input device 107 the virtual focus parameter 305 including a virtual focus distance, a virtual iris parameter 306 including weight coefficients for individual images used for image synthesis and the resolution 318 of a refocused image to be generated. Or it is also possible to store the virtual focus parameter 305, virtual iris parameter 306 and refocus image resolution 318 in a storage device such as ROM 103 or HDD 105 in advance and then have the parameter input unit 304 retrieve them from the storage device.

At step S903, the distance estimation unit 307, based on the photographed images 302 and the camera information 303 acquired at step S901, estimates a depth of the scene of interest by performing the distance estimation operation to generate a depth map 308 of the scene. The distance estimation process will be detailed later by referring to FIG. 14.

At step S904, the focus map generation unit 309, based on the virtual focus parameter 305 acquired in step S902 and the depth map 308 generated at step S903, executes a focus map generation operation to produce a focus map 310 showing an area the user wants focused (in-focus area) and an area he or she wants blurred (out-of-focus area). Details of the focus map generation process will be described later by referring to FIG. 15.

At step S905, the in-focus area image processing uses the photographed images 302 and the camera information 303 acquired by step S901, the refocus image resolution 319 acquired by step S902 and the focus map 310 generated by step S904. Based on these information, the in-focus area image processing unit 311 performs the in-focus area image processing to generate an in-focus area image 312. Details of the in-focus area image processing will be explained later by referring to FIG. 16.

At step S906, the out-of-focus area image processing unit 313 performs the out-of-focus area image processing, which uses the photographed images 302 and camera information 303, refocus image resolution 318, virtual focus parameter 305, virtual iris parameter 306 and focus map 310, all acquired by the aforementioned processing, to generate an out-of-focus image 314. Details of the out-of-focus area image processing will be explained later by referring to FIG. 17 to FIG. 19.

At step S907, the image blending unit 315 performs the image blending operation on the in-focus area image 312 generated by step S905 and the out-of-focus area image 314 generated by step S906, to produce a refocused image 316. Details of the image blending process will be described later by referring to FIG. 20.

At step S908, the image output unit 317 outputs the refocused image 316 to a secondary storage device including the output device 109 and the HDD 105 before exiting the whole process of this embodiment.

<Distance Estimation Process>

Here the distance estimation process performed at step S903 in the flow chart of FIG. 13 will be detailed. The distance estimation process, based on a plurality of images 302 photographed at different positions, generates a depth map 308 by estimating the distance to a scene of interest and divides the scene into an area that the user want focused (in-focus area) and another area (out-of-focus area) by using the depth map 308. As a result of the scene division operation, a focus map is produced. For distance estimation, any known method may be used. Among them are the stereo method and the multi-baseline stereo method. In this embodiment the stereo method is used for distance estimation. Details of the distance estimation process will be explained as follows by referring to the flow chart of FIG. 14.

Figure 14:
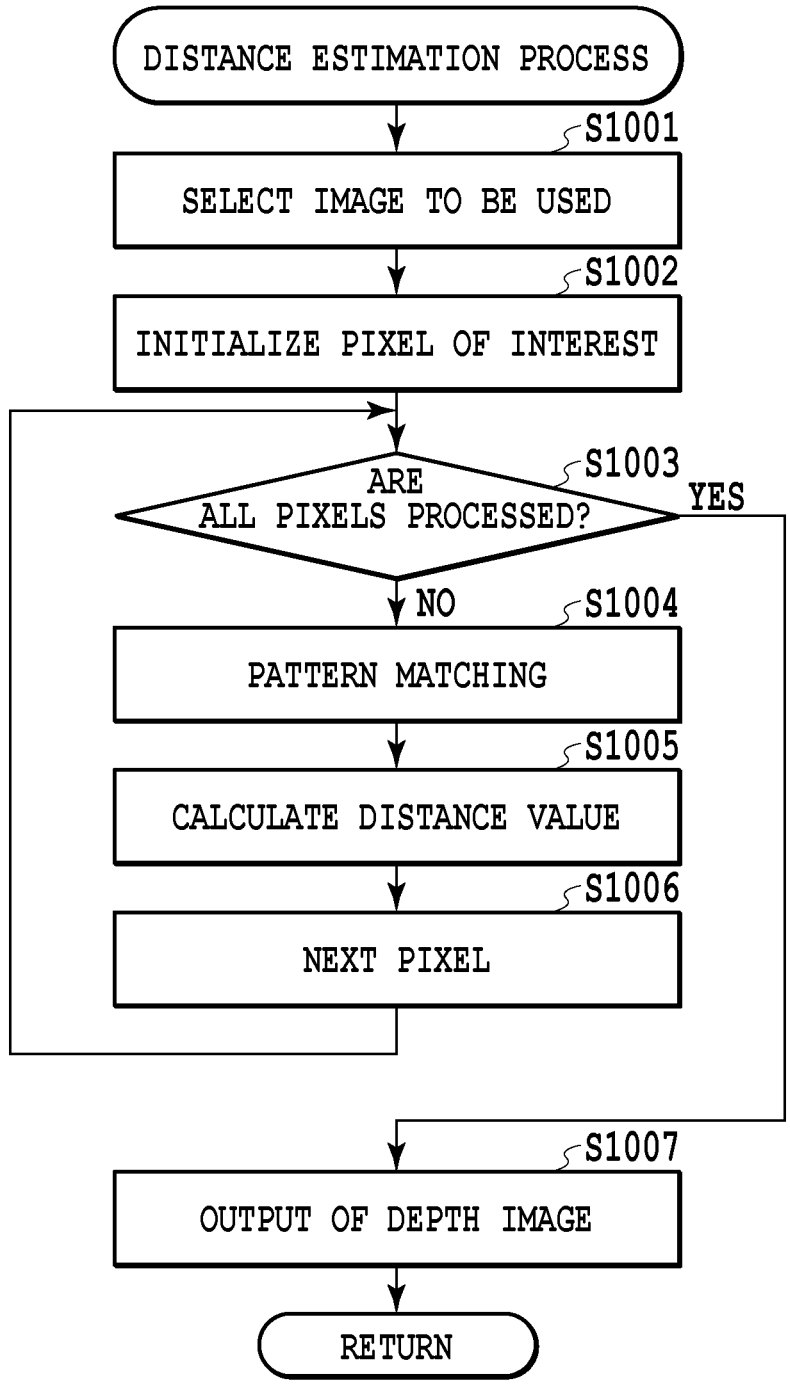
FIG. 14 is a flow chart showing a sequence of steps executed by a distance estimation process in the embodiment of the invention.
Figure 15:
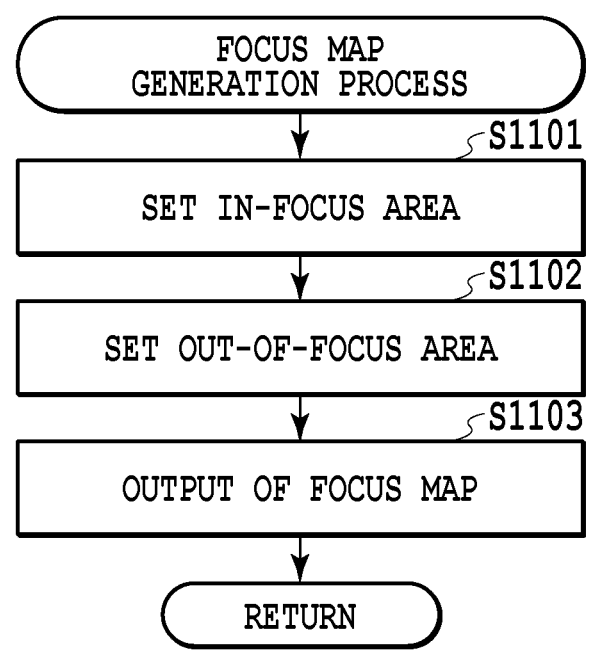
FIG. 15 is a flow chart showing a sequence of steps performed by a focus map generation process in the embodiment of the invention.
Figure 16:
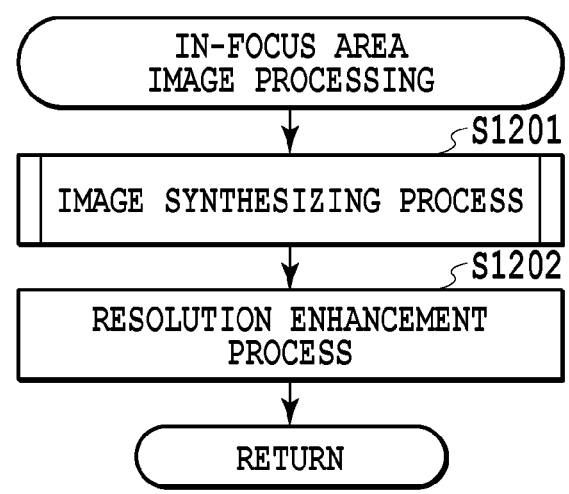
FIG. 16 is a flow chart showing a sequence of steps performed by in-focus area image processing in the embodiment of the invention.

Step S1001 in FIG. 14 selects two images from the photographed images 302 to be used in the process. In this embodiment, an image shot by a center camera unit 205 of the camera 111 and an image taken by a camera unit 206 horizontally next to the first camera unit are chosen. It is noted that any other combination of camera units may be used. The first image is referred to as a reference image and the second as a target image.

At step S1002, a pixel of interest that will undergo subsequent processing are initialized. Next step S1003 checks if the distance value has been determined for all pixels. If it is found that the distance value has been calculated for all pixels, the process moves to the next step S1007 that outputs a depth image before exiting the process. If any pixels are found that have yet to be calculated, the process proceeds to step S1004.

Figure 12:
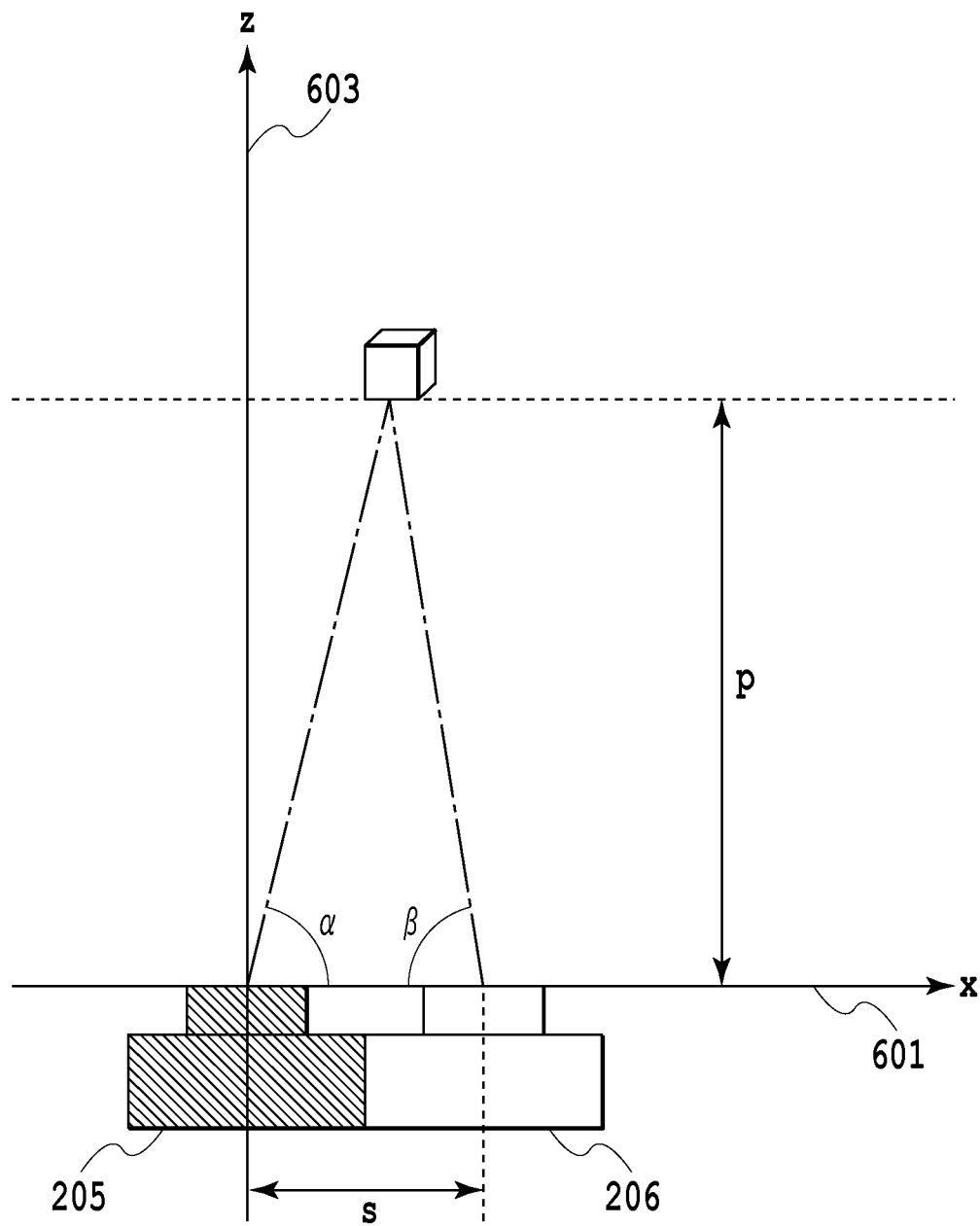
FIG. 12 shows a relationship between a distance between photographing positions and a distance to an object in the embodiment of the invention.

Step S1004 selects an area in the reference image made up of a pixel of interest and surrounding pixels, and then performs a pattern matching between the selected block of area and a target image to find a pixel in the target image that corresponds to the pixel of interest (corresponding pixel). Then step S1005 calculates a distance value p for the pixel of interest by using the camera information 303, the pixel of interest and the corresponding pixel determined by step S1004. The distance value p is expressed as follows, using α, β and s shown in FIG. 12.

$$p = \frac{\sin\alpha\sin\beta}{\sin(\pi - \alpha - \beta)} s$$

Here, α is calculated using the horizontal angle of view of the camera unit 205, the photographing position of the reference image and the coordinates of the pixel of interest; β is calculated using the horizontal angle of view of the camera unit 206, the photographing position of the target image and the coordinates of the corresponding pixel; and s is a distance between the two camera units and calculated from the photographing positions of the reference image and the target image. Step S1006 updates the pixel of interest before returning to step S1003 where, if there is any unprocessed pixel, the distance value p is similarly determined for that pixel and, if no more unprocessed pixel is found, the process proceeds to step S1007 where it performs the output process.

At step S1007, a depth map 308 with the distance values p in the reference image taken as pixel values of individual pixels is output. Based on this depth map that maps distances of individual pixels of an object from the camera, a focus map is produced. While in this embodiment step S1001 has selected the camera units 205 and 206 for distance estimation, any other combination of camera units may be used for this purpose.

<Focus Map Generation Process>

Here, we will explain in detail the focus map generation process as performed by step S904 in the flow chart of FIG. 13. Using the virtual focus parameter 305 acquired by step S902 and the depth map 308 acquired by step S903, this process divides a scene into an area the user wants focused (in-focus area) and another area (out-of-focus area) to produce the focus map 310. Referring to the flow chart of FIG. 15, the focus map generation process will be described in detail.

Step S1101 sets the in-focus area as follows. Let the virtual focal distance acquired from the virtual focus parameter 305 be d and a pixel value in the depth map 308 be D(i, j). At this time, a set of pixels (i, j) with D(i, j)=d is taken to be the in-focus area. Step S902 performs an out-of-focus area setting as follows. In the depth map 308, a set of pixels in other than the in-focus area is taken to form the out-of-focus area. In step S903, depending on whether the pixel of interest is included in the in-focus area or in the out-of-focus area, a different label value is assigned to each pixel to produce a focus map 310.

Figure 5:
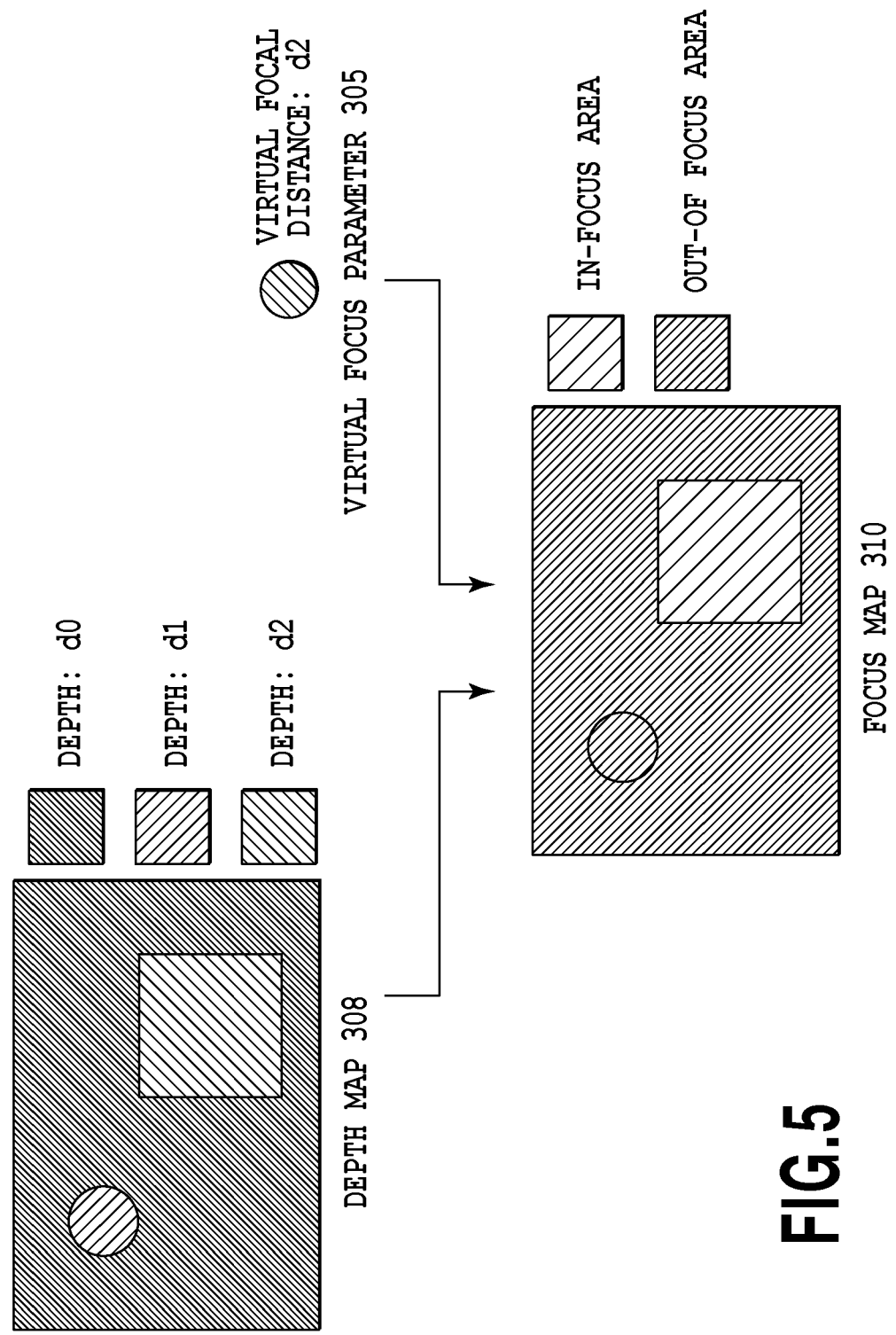
FIG. 5 shows an outline of processing performed by a focus map generation unit in the embodiment of the invention.

An example of the focus map 310 obtained by the above processing is shown in FIG. 5. The depth map 308 is assumed to be an image represented by distance values d0, d1 and d2 and the virtual focal distance obtained from the virtual focus parameter 305 is also assumed to be d2. In that case, a set of pixels in the depth map 308 whose distance values are d2 is set as an in-focus area in the focus map, while a set of pixels with their distance values of d0 and d1 is set as an out-of-focus area.

Although at step S1101 in this example, the area in the depth map 308 whose pixel values D(i, j) are equal to the virtual focal distance d is taken to be the in-focus area, other methods of setting the in-focus area may be employed. For example, pixels D(i, j) that satisfy [d−α1≤D(i, j)≤d+α2] may be taken as the in-focus area. At this time, the values of α1 and α2 are determined by considering a virtual depth of field in the refocus image 316 as determined by the virtual iris parameter 306.

<Out-of-Focus Area Image Processing>

This embodiment is characterized in that different image processing is performed in the in-focus area and in the out-of-focus area, so both of them will be explained in the following. First, details of the out-of-focus area image processing as performed by step S906 in the flow chart of FIG. 13 will be explained here. In generating an out-of-focus area image 314, the out-of-focus area image processing places greater emphasis on an area set as the out-of-focus area in the focus map 310. While the out-of-focus area image processing will be described in detail by referring to the flow chart of FIG. 17 and the configuration of the processing units shown in FIG. 4, parts of this processing will be presented later in further detail. That is, to alleviate processing load, this processing reduces the amount of data to be processed, by performing reduction of target images and interpolation operation on the reduced images before synthesizing the images, as described in the following explanation. Details of the image interpolation operation and the image synthesizing operation will be described later by referring to FIG. 18 and FIG. 19.

At step S1301, the image reduction unit 401 performs an image reduction operation on the photographed images 302 to produce reduced images 405. The image reduction operation may use such known methods as the bi-linear method and the bi-cubic method. The resolution of the reduced images may be determined arbitrarily according to the requirements of the camera as a whole, object and environment as long as it is lower than that of the photographed images 302. For example, the resolution of the reduced images may be determined according to the degree of blur of the out-of-focus area as conditioned by the camera information 303, virtual focus parameter 305 and virtual iris parameter 306. Alternatively, a predetermined resolution may be acquired from the parameter input unit 304.

The image interpolating unit 402 at step S1302 performs an interpolation operation on the reduced images 405 to produce interpolated images 406. Details of the image interpolation process will be described later by referring to FIG. 18. In step S1303, the image synthesizing unit 403 uses the reduced images 405, the interpolated images 406, the focus map 310, the virtual focus parameter 305 and the virtual iris parameter 306 to produce a synthesized image (of the out-of-focus area) 407. Details of the image synthesizing process will be described later by referring to FIG. 19.

At step S1304, the image enlargement unit 404 enlarges the synthesized image (of the out-of-focus area) 407 generated by the preceding step to the resolution 319 of the refocused image to produce an out-of-focus image 408 before exiting the processing. For the image enlargement process, a known method may be used, such as the bi-linear method and the bi-cubic method.

<Image Interpolation Process>

Figure 17:
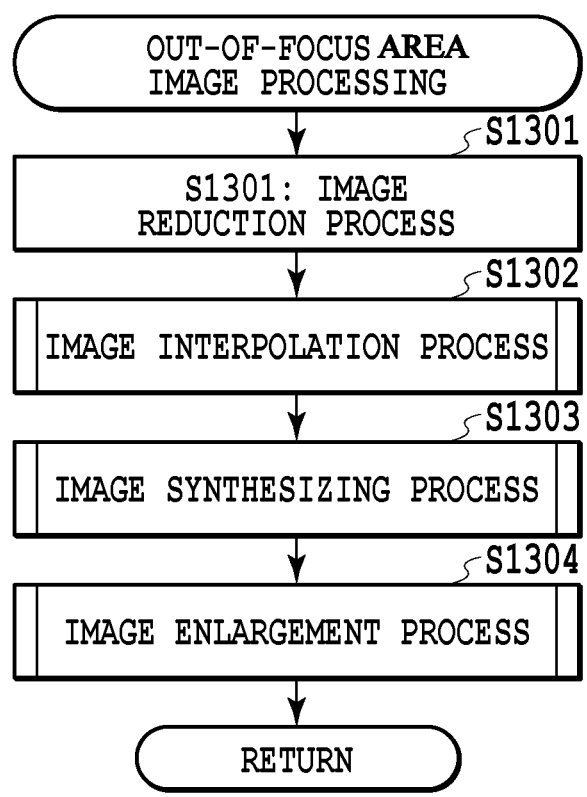
FIG. 17 is a flow chart showing a sequence of steps performed by out-of-focus area image processing in embodiment 1.
Figure 18:
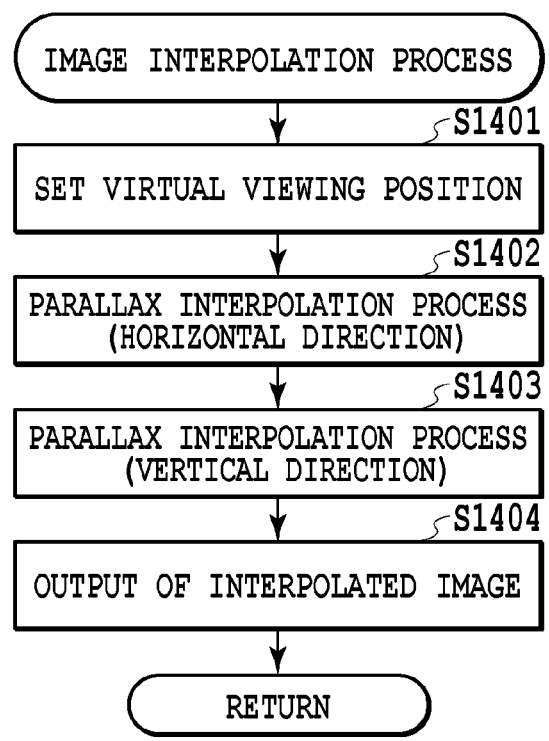
FIG. 18 is a flow chart showing a sequence of steps performed by an image interpolation process in the embodiment of the invention.

The image interpolation process as performed by the step S1302 of FIG. 17 will be explained in detail by referring to FIG. 18. In the image interpolation process, the first step is to set virtual viewing positions 409 based on the camera information 303 so as to interpolate between the photographing positions of the images 302. Next, based on the reduced images 405 obtained at step S1301, interpolated images 406 corresponding to the respective virtual viewing positions 409 are generated by a parallax interpolation process. Now, by referring to the flow chart of FIG. 18 and the processing units shown in FIG. 4, the image interpolation process will be detailed as follows.

Figure 7:
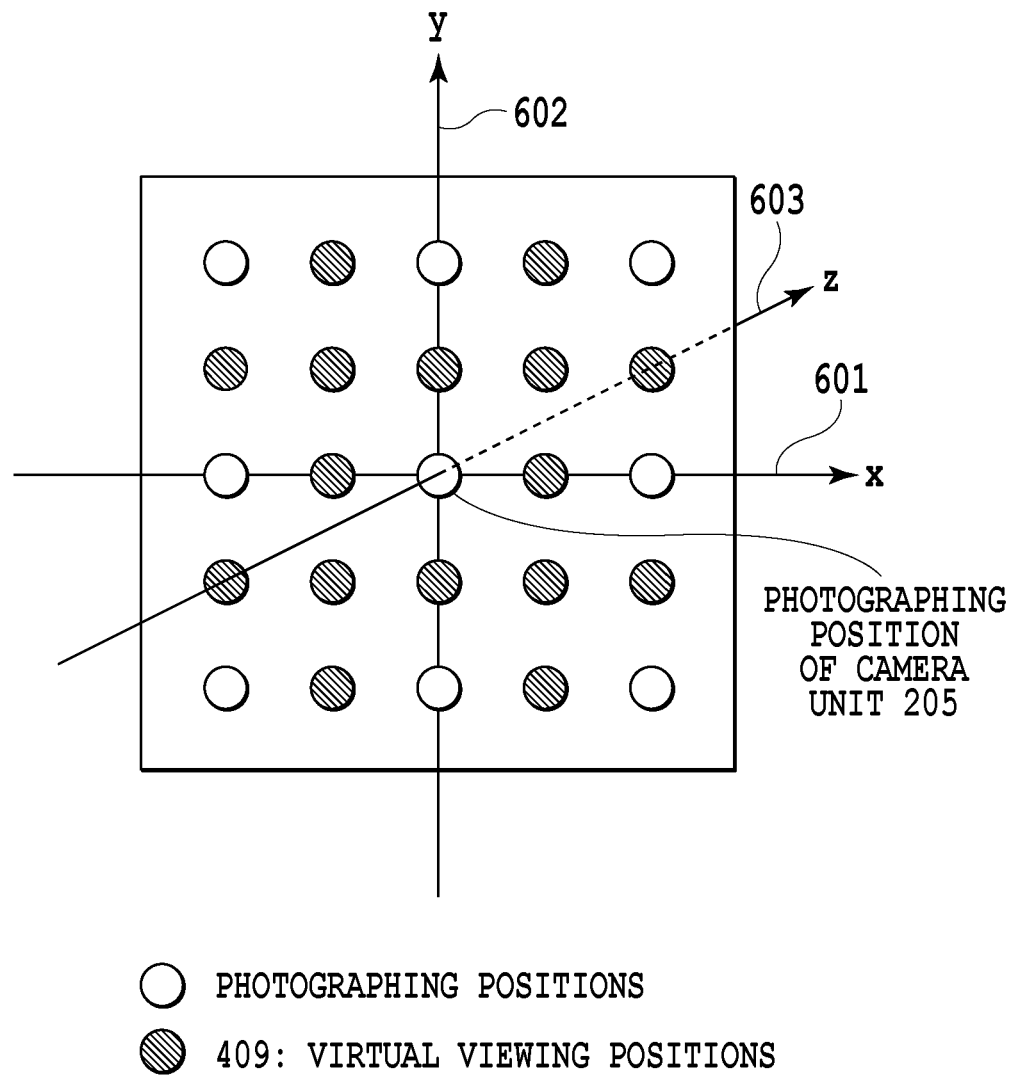
FIG. 7 shows a relationship between photographing positions and virtual viewing positions in the embodiment of the invention.
Figure 8:
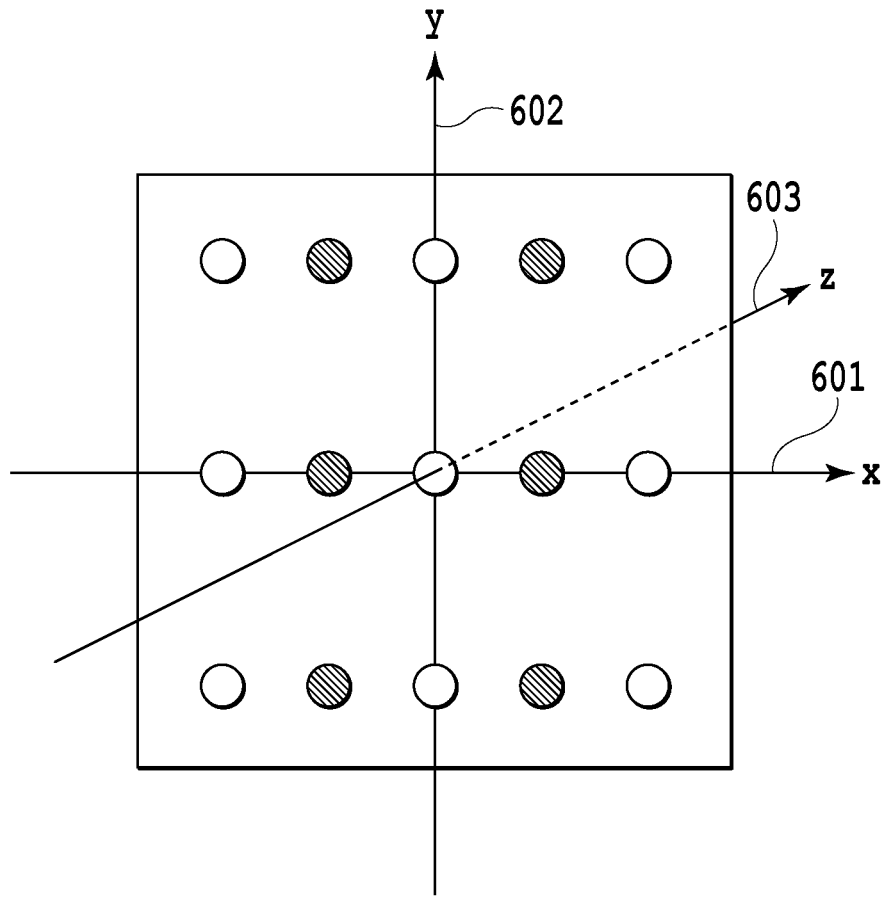
FIG. 8 shows a relationship between photographing positions and virtual viewing positions in the embodiment of the invention.
Figure 9:
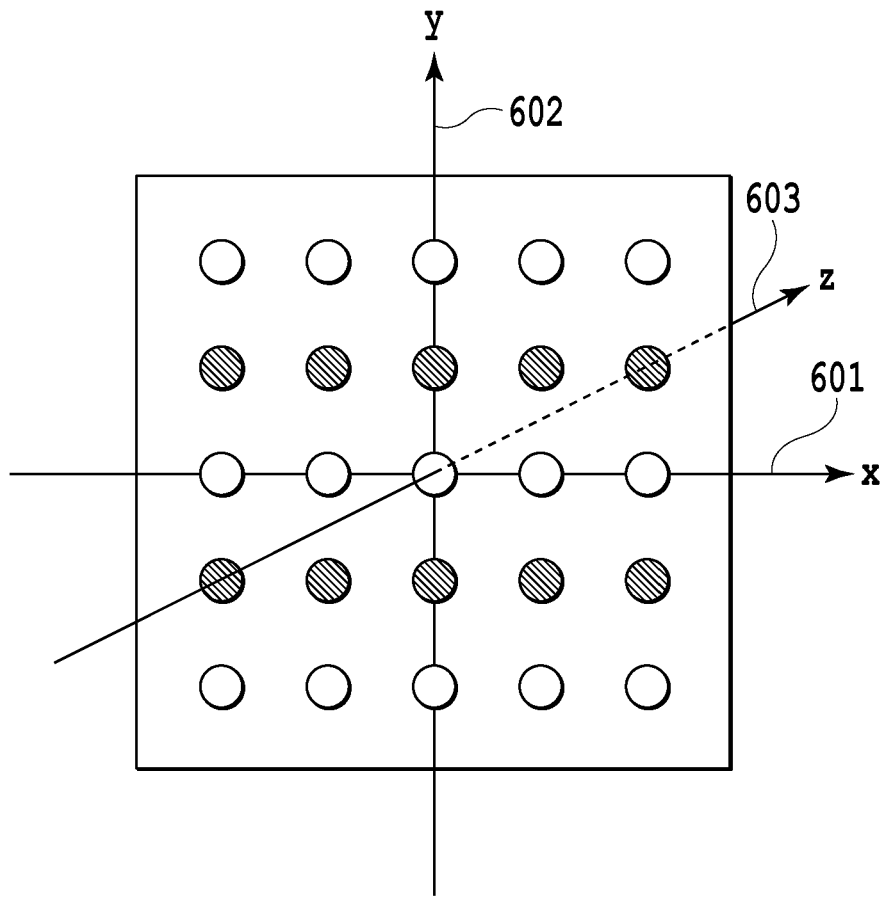
FIG. 9 shows a relationship between photographing positions and virtual viewing positions in the embodiment of the invention.

Step S1401 sets virtual viewing positions 409 to be used for generating interpolated images. The relationship between the photographing positions and the virtual viewing positions is shown in FIG. 7. An x-axis 601, a y-axis 602 and a z-axis 603 correspond to a horizontal direction, a vertical direction and an optical axis direction of each camera unit, all these crossing each other at right angles at the associated photographing position as their origin. The virtual viewing positions 409 are so set that they will come between the photographing positions. In this example, the virtual viewing positions 409 are set in a lattice configuration in such a manner that they are located at equal intervals between the photographing positions, as shown in FIG. 7 to FIG. 9.

Step S1402 successively selects from among the reduced images 405 two images laterally adjoining each other in the photographing position and produces interpolated images 406 that correspond to the virtual viewing positions 409 between the two images by using the parallax interpolation process. FIG. 8 shows virtual viewing positions that are used to generate interpolated images in step S1402. The parallax interpolation process can use known methods. For example, an image for an intermediate viewing point can be generated by interpolation, based on parallaxes for individual pixels calculated by the block matching between two images. Another method may involve matching characteristic points in one of the two images to the corresponding points in the other and, based on the characteristic point relationship between the two images, performing a morphing operation to generate an image for an intermediate viewing point. Any desired method known in other fields may also be employed.

Step S1403 successively selects, from among the reduced images 405 and the interpolated images 406 generated by step S1402, a pair of images vertically adjoining each other in the photographing position and generates interpolated images corresponding to the virtual viewing positions 409 between the two images by performing the parallax interpolation operation. FIG. 9 shows virtual viewing positions used to generate interpolated images in step S1403. The parallax interpolation process can employ the method similar to the one used in step S1402. Step S1404 outputs the interpolated images 406 generated by step S1402 and step S1403.

<Image Synthesizing Process>

Next, the image synthesizing process performed in step S1303 of FIG. 17 will be explained. The image synthesizing process first sets a weight coefficient for each image according to the virtual iris parameter 306. Then, based on the camera information 303 and the virtual viewing positions 409, this process shifts the individual images and performs weighted addition by using different weight coefficients for different areas to generate a synthesized image (of the out-of-focus area) 407. Referring to the flow chart of FIG. 19 and the configuration of the processing units shown in FIG. 4, the image synthesizing process will be described in detail.

Figure 10:
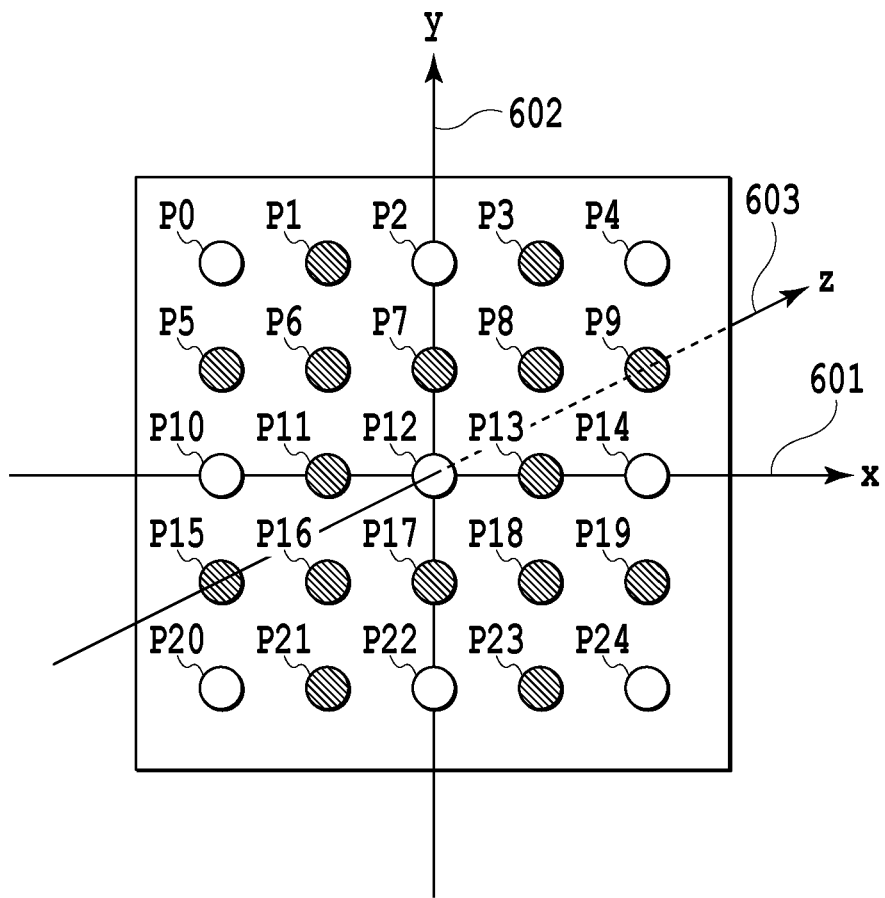
FIG. 10 shows an example of weight coefficients in the embodiment of the invention.

Step S1501, based on the virtual iris parameter 306 acquired at step S902, sets weight coefficients that are to be used in synthesizing images. First, the weight coefficients used for the image synthesizing operation will be explained by referring to FIG. 10 and FIG. 11. The virtual iris parameter 306 is a set of coefficients to be applied to those images that are obtained at the photographing positions and the virtual viewing positions 409. The photographing positions and the virtual viewing positions 409 are denoted P0-P24 as shown in FIG. 10 and an image obtained at a photographing position $P_m$ (m=0-24) is denoted $I_m$. At this time, according to the virtual iris parameter 306, the value of the weight coefficient corresponding to an image $I_m$, A(m), can be set as shown in FIG. 11. Here, the weight coefficients are so set that they conform to the Gaussian function with $P_{12}$ at a center, and are also normalized so that the sum of the weight coefficients is 1. This enables the out-of-focus area to be smoothly blurred.

Step S1502, based on the camera information 303 and the virtual viewing positions 409, calculates an amount of shift for each image. If the focal distance is denoted d, the amount of horizontal shift Δi (m, d) and the amount of vertical shift Δj (m, d) for an image $I_m$ can be expressed as:

$$\Delta i(m, d) = \frac{(s_m - s')W}{2d\tan\left(\frac{\theta_w}{2}\right)}$$

-continued $$\Delta j(m, d) = \frac{(t_m - t')H}{2d\tan\left(\frac{\theta_h}{2}\right)}$$

Here, W and H represent horizontal and vertical sizes of an image respectively, θw a horizontal angle of view of a camera unit, θh a vertical angle of view of the camera unit, and ($s_m$, $t_m$) a coordinate of $P_m$ on the xy plane. (s', t') is a coordinate on the xy plane of the photographing position $P_{12}$ of the camera unit 205.

Step S1503 performs a weighted addition on the reduced images 405 and the interpolated images 406 by using the amounts of shift determined by step S1502 and the weight coefficients determined by step S1501, to generate a synthesized image (of the out-of-focus area) 407. If we let the synthesized image (of the out-of-focus area) 407 be H, the synthesizing operation is expressed as:

$$H(i, j) = \sum_m A(m) I_m(i + \Delta i(m, d), j + \Delta j(m, d))$$

At step S1504, the synthesized image (of the out-of-focus area) 407 generated by the preceding step is output.

<In-Focus Area Image Processing>

Here, we will describe the in-focus area image processing as performed by step S905. The in-focus area image processing places greater importance on an area set as the in-focus area in the focus map 310 than on other area to generate an in-focus area image 312. Details of the in-focus area image processing will be explained by referring to the flow chart of FIG. 16.

Figure 19:
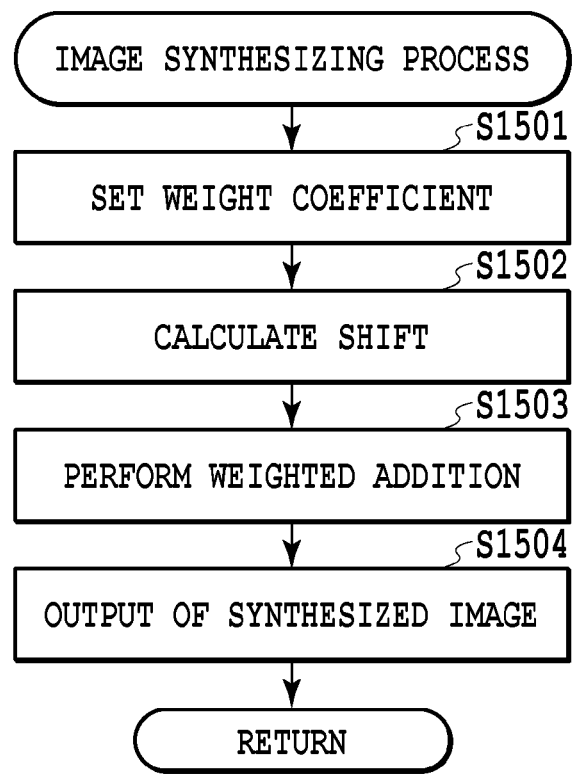
FIG. 19 is a flow chart showing a sequence of steps performed by an image synthesizing process in the embodiment of the invention.
Figure 20:
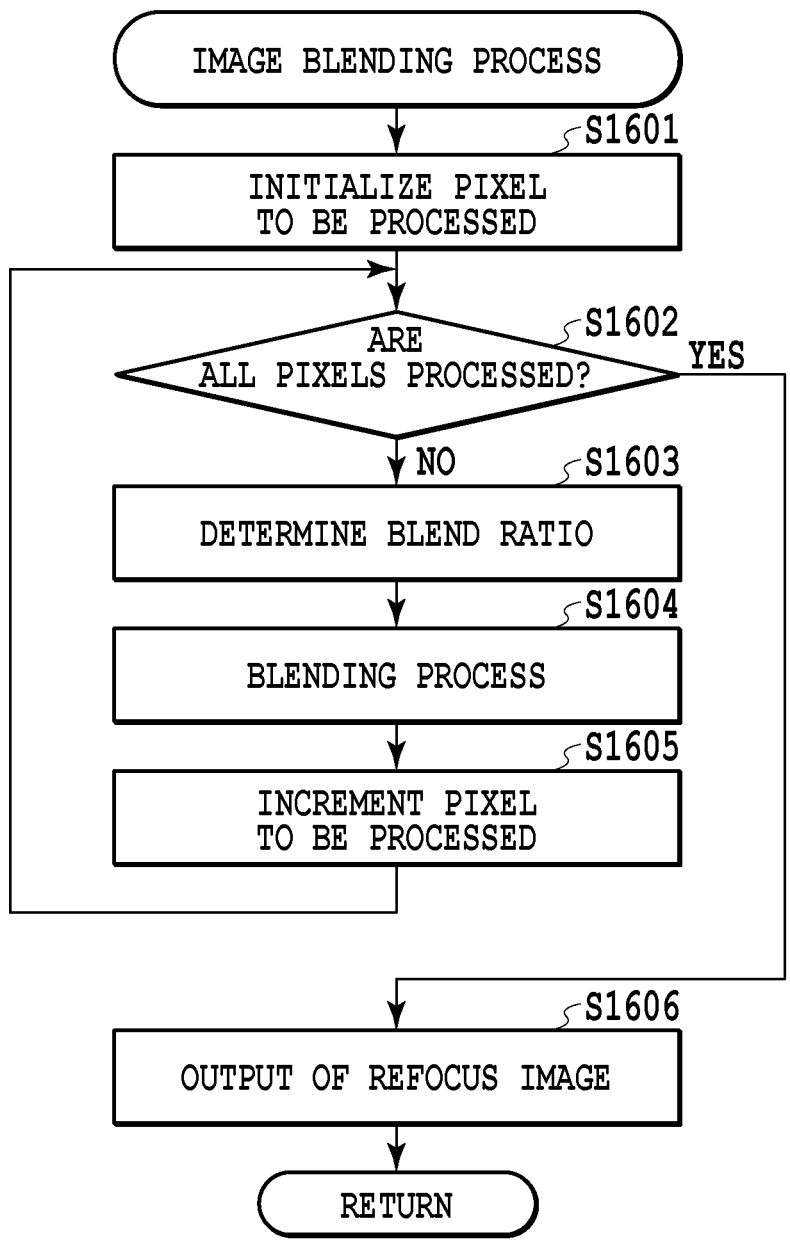
FIG. 20 is a flow chart showing a sequence of steps performed by an image blending process in embodiment 1.

Step S1201 performs the image synthesizing process similar to the one explained in the flow chart of FIG. 19. It is noted, however, that while in FIG. 19 m=0-24, the processing in the step S1201 is executed for only the photographing positions, namely m=0, 2, 4, 10, 12, 14, 20, 22, 24 and that only the photographed images 302 are used instead of the reduced images 405 and interpolated images 406. So, the position $P_m$ represents only a photographing position and the image $I_m$ only a photographed image 302. Further, as for the weight coefficient A(m), a coefficient corresponding to the photographing position is normalized again for use in the synthesizing operation. The image synthesizing process is executed under the aforementioned conditions to produce a synthesized image (of the in-focus area).

Step S1202 performs a known resolution enhancement operation on the synthesized image (of the in-focus area) to generate an in-focus area image 312. For example, a sharpness operation may be done to improve the sharpness of the in-focus area. Other resolution enhancement operations may also be used, including super-high resolution operations that may be performed based on the amounts of shift calculated in the image synthesizing process. One such super-high resolution operation applicable to this embodiment is a method using the MAP (Maximum A Posteriori) estimation. The MAP method estimates high resolution images by minimizing an evaluation function that adds probability information on the high resolution images to squared errors. In other words, this method uses prior information on high resolution images and parameters representing positional shifts among the images and estimates high resolution images as an optimization problem for maximizing a posterior probability. A variety of other methods that are known in this technical field may be used to obtain the in-focus area image 312.

<Image Blending Process>

Next, the image blending process as performed by step S907 will be explained. The image blending process blends the in-focus area image 312 and the out-of-focus area image 314 according to the focus map 310 to generate a refocused image 316. Details of the image blending process will be described by referring to the flow chart of FIG. 20 and the configuration shown in FIG. 3.

Step S1601 initializes an index of pixel of interest that is to be processed by the blending process. Step 1602 checks if the blending process has been completed for all pixels. If so, the processing moves to step S1606 where it outputs a refocused image before exiting the process. If the blending process is found not finished, the processing proceeds to step S1603.

Step S1603 determines a blend ratio at which to blend the pixel value of the in-focus area image 312 and the pixel value of the out-of-focus area image 314. This step also refers to the focus map to see if a pixel corresponding to the pixel to be processed is set as the in-focus area. If so, the blend ratio $r_b$ of the pixel is set to 1.0. If the pixel is found to be set as the out-of-focus area, its blend ratio $r_b$ is set to 0.0. Step S1604 executes the blending operation on the pixel values according to the following equation.

$$R(i,j)=r_b I_{in}(i,j)+(1-r_b) I_{out}(i,j)$$

Here, R(i, j) is a pixel value of the refocused image generated by the blending process, $I_{in}$ is a pixel value of the in-focus area image 312 and $I_{out}$ is a pixel value of the out-of-focus area image 314. Step S1605 increments by one the index of the pixel being processed. Step S1606 outputs a refocused image generated by the blending process.

As described above, this embodiment switches the processing between the in-focus area and the out-of-focus area. That is, in the in-focus area the resolution enhancement operation is performed, whereas in the out-of-focus area a reduced, synthesized image is generated before being enlarged. This enables the image quality in the in-focus area to be improved while at the same time minimizing the calculation cost for generating interpolated images required for the image synthesizing process.

Figure 6:
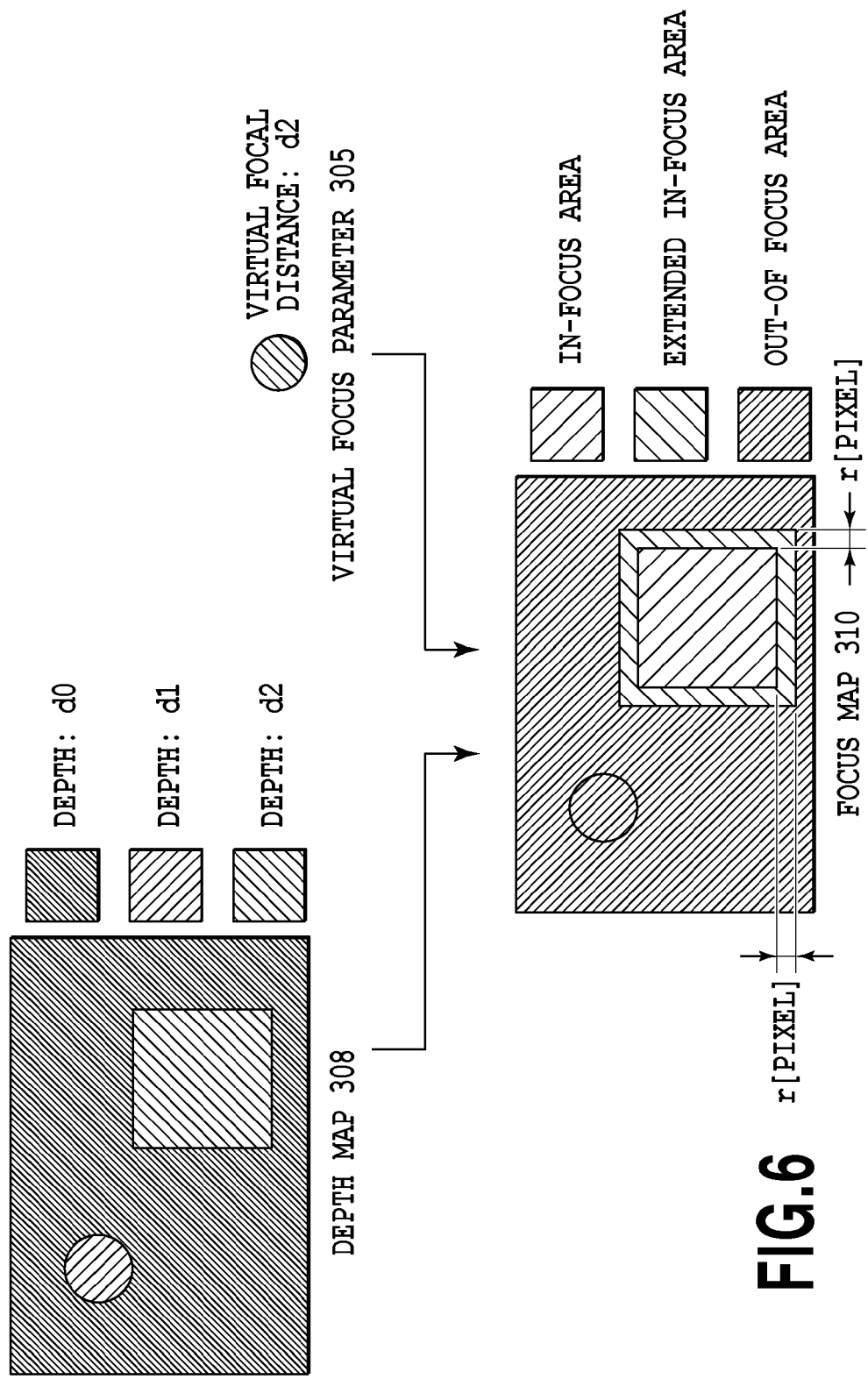
FIG. 6 shows an outline of processing performed by a focus map generation unit in the embodiment of the invention.

While in the image blending process of this embodiment, a pixel value of either the in-focus area image 312 or the out-of-focus area image 314 has been described to be adopted, the invention is not limited to this method. To make the boundary between the two areas less conspicuous, the following processing may be additionally performed. As shown in FIG. 6, an extended in-focus area, which is obtained by expanding the in-focus area, is set in the focus map. This may be formed, for example, by widening the edges of the in-focus area by r pixels. The size and shape of the extended in-focus area are not limited to this example and any desired setting may be made as long as the extended area encloses the in-focus area.

Figure 21:
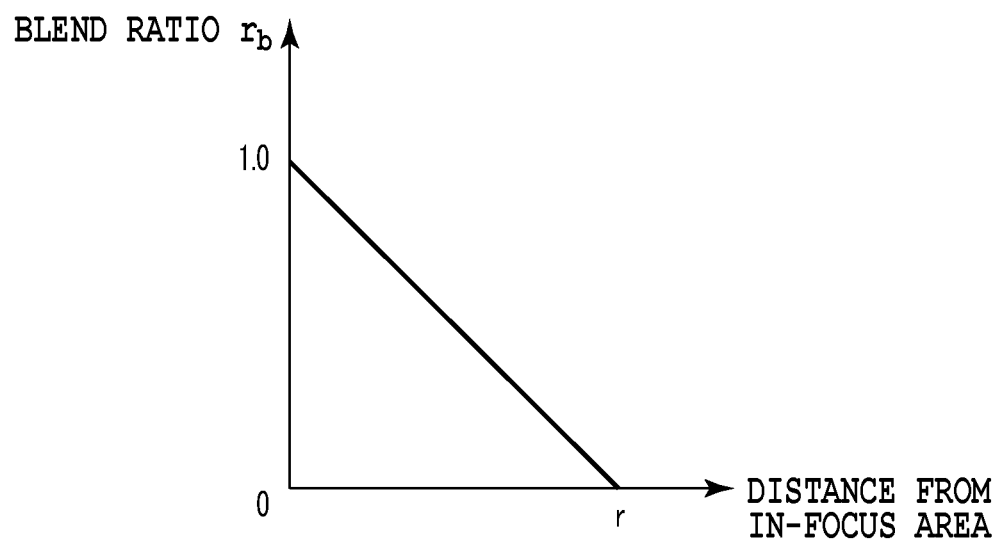
FIG. 21 shows an example of a blend ratio used in the image blending process in embodiment 1.

Next, in the image blending process, the blend ratio $r_b$ for the extended in-focus area is determined so that it changes linearly in proportion to the distance from the in-focus area, as shown in FIG. 21. That is, as the pixel of interest in the extended in-focus area moves away from the in-focus area, the factor of contribution that the in-focus area image 312 makes to that pixel becomes smaller during the blending operation. By performing the image blending operation using the blend ratio thus determined, the boundary between the in-focus area and the out-of-focus area can be made less conspicuous, as shown in FIG. 6.

Embodiment 2

In embodiment 1 only one resolution has been used for the synthesized image (of the out-of-focus area) generated by the out-of-focus area image processing. The second embodiment provides a plurality of out-of-focus area images having different resolutions and, during the image blending process, selects an image to be used according to the distance information obtained from the depth map. This can lead to a further reduction in the calculation cost for generating the interpolated images required by the image synthesizing process.

Of the entire processing, the out-of-focus area image processing and the image blending process in this embodiment both differ from the corresponding processes in embodiment 1 and thus will be described in detail. Other processes are similar to the corresponding ones of embodiment 1 and therefore their explanations are omitted.

<Out-of-Focus Image Processing>

Figure 22:
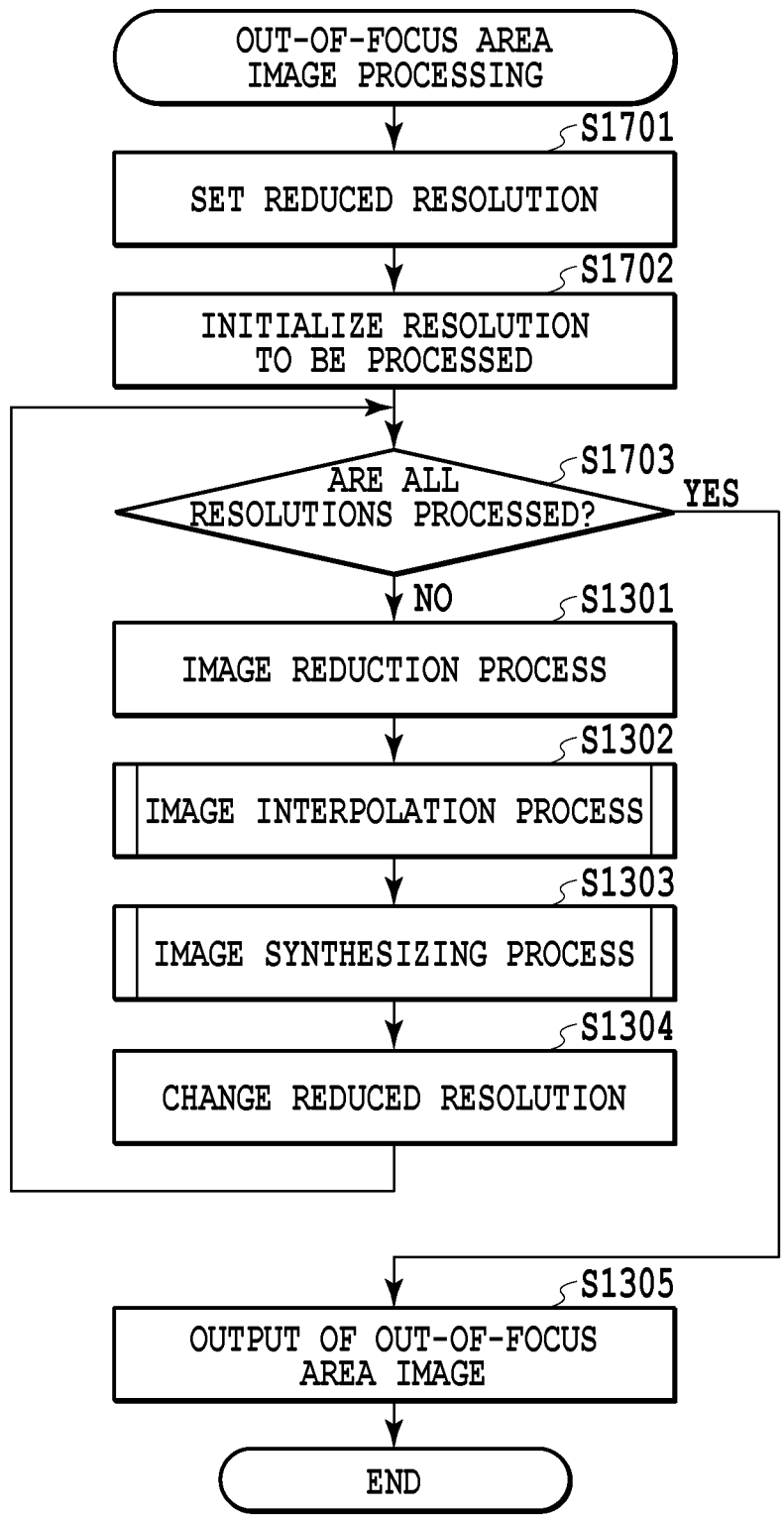
FIG. 22 is a flow chart showing a sequence of steps performed by the out-of-focus area image processing in embodiment 2.

Details of the out-of-focus area image processing in this embodiment will be explained by referring to the flow chart of FIG. 22. As for the steps similar to the corresponding ones in the out-of-focus area image processing of embodiment 1 described in FIG. 17, like reference numbers are used and their explanations omitted.

Step S1701 sets a plurality of reduced resolutions $S_n$ (n is 1 or higher) that constitute resolutions of a synthesized image (of the out-of-focus area). For example, n resolutions may be set which are ½, ¼, ⅛, ... the resolution of the photographed images 302 in horizontal and vertical directions. Or, it is possible to estimate from the depth map 308, the virtual focus parameter 305 and the virtual iris parameter 306 the level of blur for each distance to an object in the scene and, based on the estimated level of blur, set a plurality of resolutions.

Figure 23:
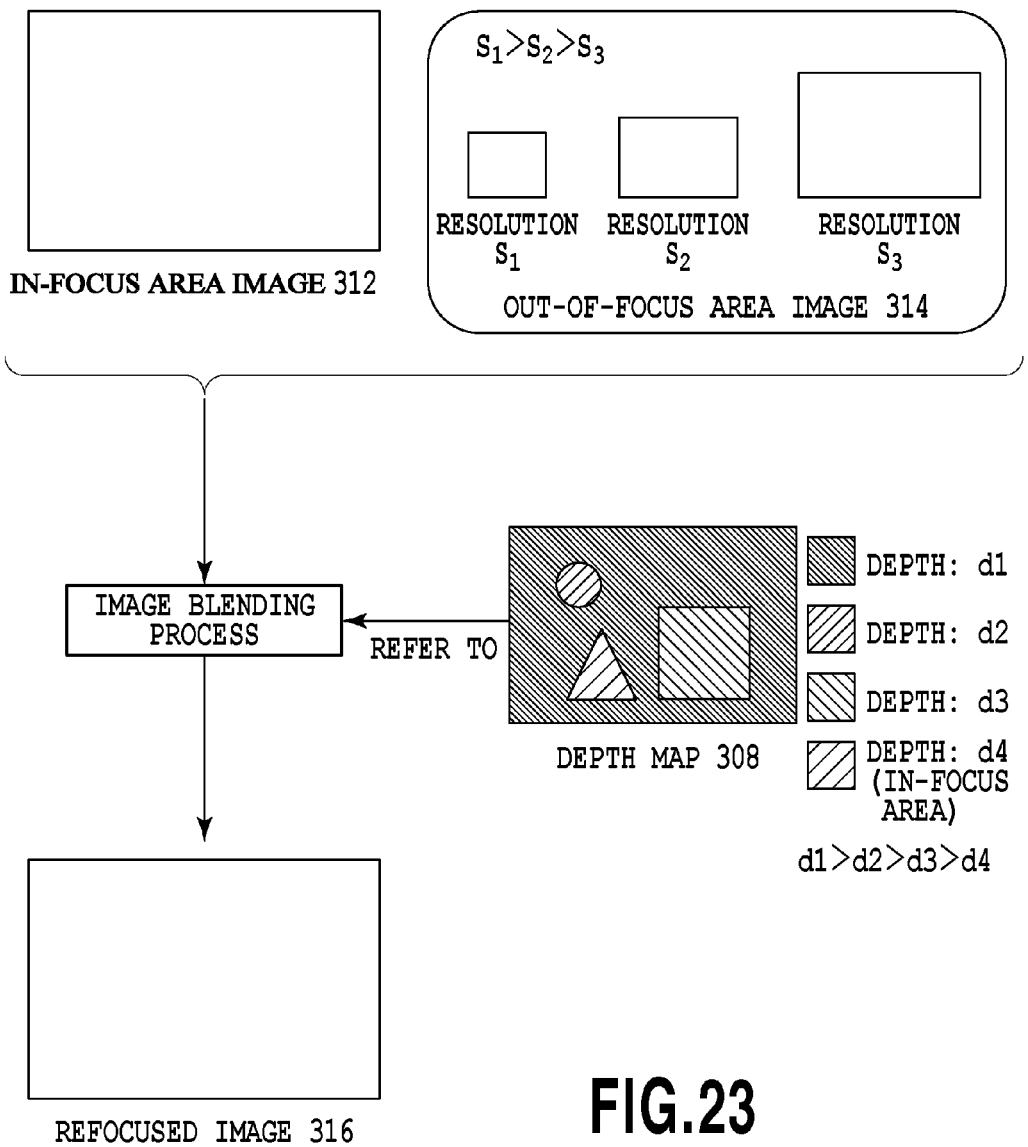
FIG. 23 shows an outline of processing performed by the image blending process in embodiment 2.

In FIG. 23, the depth map 308 has four distance values d1, d2, d3, d4 (d1>d2>d3>d4), with d4 representing the distance to the in-focus area. In this case, three reduced resolutions corresponding to d1, d2 and d3 are set as $S_1$, $S_2$ and $S_3$ ($S_1<S_2<S_3$) respectively.

Step S1702 sets the reduced resolution of an area to be processed to an initial value. Then at step S1703, a check is made to see if the processing for all of the reduced resolutions $S_n$ set by step S1701 has been completed. If so, the processing moves to step S1705 where it outputs the out-of-focus area image before being exiting the process. If any unprocessed resolution still remains, the processing moves to step S1301 to process the remaining resolutions.

Step S1302 and S1303 perform the same processing as in embodiment 1. At step S1704, the reduced resolution is changed to other resolution that has yet to be processed. Step S1705 outputs a plurality of synthesized images (of the out-of-focus area) 407 generated by the foregoing steps as out-of-focus area images 408.

<Image Blending Process>

Figure 24:
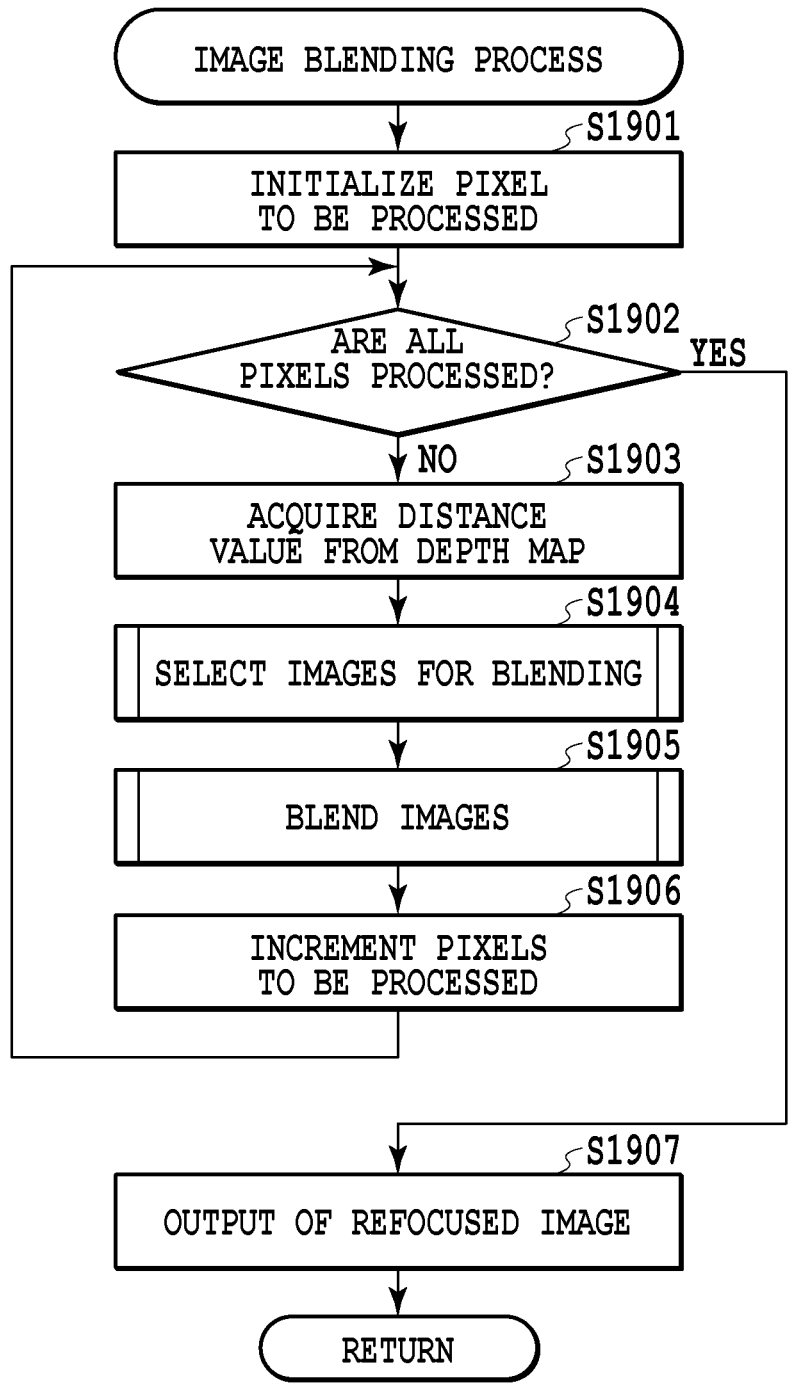
FIG. 24 is a flow chart showing a sequence of steps performed by the image blending process in embodiment 2.

The image blending process in this embodiment is performed using the in-focus area image 312, a plurality of out-of-focus area images 314 with different resolutions and the depth map 308. Details of the image blending process of this embodiment will be described by referring to the flow chart of FIG. 24 and the blending process of FIG. 23. Step S1901 sets an index of a pixel to be processed by the blending operation to an initial value.

Step S1902 checks if the blending operation is completed for all pixels. If so, the processing moves to step S1907 where it outputs a refocused image before exiting the process. If not, it proceeds to step S1903. Step 1903 refers to the depth map 308 shown in FIG. 23 to acquire the distance value corresponding to the position of the pixel being processed.

Step S1904 selects an out-of-focus area image that corresponds to the distance value acquired by step S1903. If, for example, the acquired distance value is d1 in FIG. 23, an image with a resolution $S_1$ is chosen; and if the distance value is d2, an image with a resolution $S_2$ is chosen.

Step S1905 acquires by a known image interpolation operation (e.g., bi-cubic method) a pixel value corresponding to the position of the pixel being processed in the out-of-focus area image chosen by step S1904. Step S1906 increments the index of the pixel being processed by one. Step S1907 outputs a refocused image generated by the blending operation.

As described above, by preparing a plurality of out-of-focus area images with different resolutions and using the distance information acquired from the depth map in executing the blending operation, the calculation cost for generating the interpolated images required by the image synthesizing process can further be reduced.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-198878, filed Sep. 12, 2011, which is hereby incorporated by reference herein in its entirety.

What is claimed is:

1. An image processing apparatus comprising:
a photographed data input unit configured to acquire a plurality of images photographed from at least two different viewing positions;
an input unit configured to input a refocus parameter representing a distance from a camera to a virtual focal plane;
a distance estimation unit configured to generate a depth map for the acquired images indicating distances between photographed objects corresponding to pixels and a camera;
a focus map generation unit configured to generate a focus map indicating an in-focus area to be sharply focused and an out-of-focus area to be blurred, by calculating areas including the in-focus area and the out-of-focus area from the depth map according to the refocus parameters;
an in-focus area image processing unit configured to generate a synthesized image by performing a resolution enhancement process on the in-focus area and synthesizing a group of images including at least the photographed images;
an out-of-focus area image processing unit configured to generate a synthesized image by performing an operation, different from the resolution enhancement process performed by the in-focus area image processing unit, on the out-of-focus area and synthesizing a group of images including at least the photographed images, wherein the out-of-focus area image processing unit further comprises:
an image reduction unit configured to reduce resolution of images in the out-of-focus area; and
an image interpolation unit to generate interpolated images by interpolating between the reduced images through interpolation between the viewing positions,
wherein the out-of-focus area image processing unit generates a synthesized image of the out-of-focus area by synthesizing the reduced images and the interpolated images,
wherein the out-of-focus area image processing unit generates a synthesized image at a resolution lower than that of the photographed images in the out-of-focus area using the image reduction unit, and
wherein the out-of-focus area imaging processing unit further includes an image enlargement unit configured to transform the synthesized image to the one with an output resolution; and
an image blending unit configured to generate a refocused image by blending the synthesized image of the in-focus area and the synthesized image of the out-of-focus area according to the focus map.

2. An image processing apparatus according to claim 1, wherein a plurality of synthesized images with different resolutions are generated and held in the out-of-focus area.

3. An image processing method comprising:
a photographed data input step of acquiring a plurality of images photographed from at least two different viewing positions;
an input step of inputting a refocus parameter representing a distance from a camera to a virtual focal plane;
a distance estimation step of generating a depth map for the acquired images indicating distances between photographed objects corresponding to pixels and a camera;
a focus map generation step of generating a focus map indicating an in-focus area to be sharply focused and an out-of-focus area to be blurred, by calculating areas including the in-focus area and the out-of-focus area from the depth map according to the refocus parameters;
an in-focus area image processing step of generating a synthesized image by performing a resolution enhancement process on the in-focus area and synthesizing a group of images including at least the photographed images;
an out-of-focus area image processing step of generating a synthesized image by performing an operation, different from the resolution enhancement process performed by the in-focus area image processing step, on the out-of-focus area and synthesizing a group of images including at least the photographed images, wherein the out-of-focus area image processing step further comprises:
an image reduction step of reducing resolution of images in the out-of-focus area; and
an image interpolation step of generating interpolated images by interpolating between the reduced images through interpolation between the viewing positions,
wherein the out-of-focus area image processing step generates a synthesized image of the out-of-focus area by synthesizing the reduced images and the interpolated images,
wherein the out-of-focus area image processing unit generates a synthesized image at a resolution lower than that of the photographed images in the out-of-focus area using the image reduction unit;

wherein the out-of-focus area imaging processing unit further includes an image enlargement unit configured to transform the synthesized image to the one with an output resolution; and an image blending step of generating a refocused image by blending the synthesized image of the in-focus area and the synthesized image of the out-of-focus area according to the focus map.

* * * * *